Dec. 31, 1963   L. F. BLATT   3,116,058
CYLINDER OPERATED POWER CLAMP
Filed March 31, 1961   2 Sheets-Sheet 1
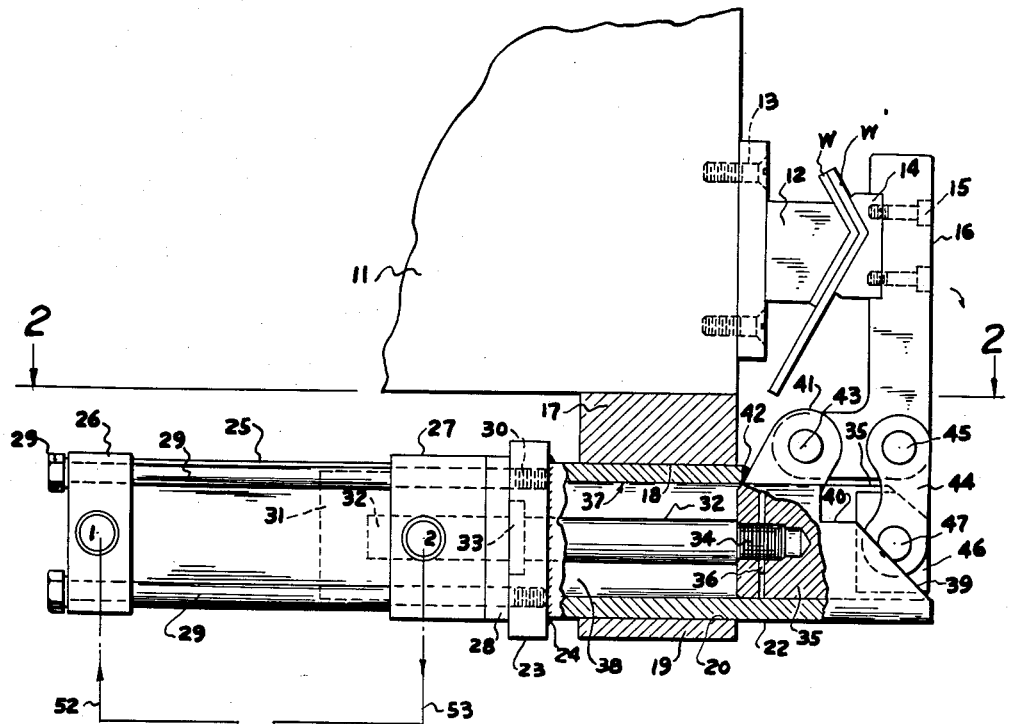
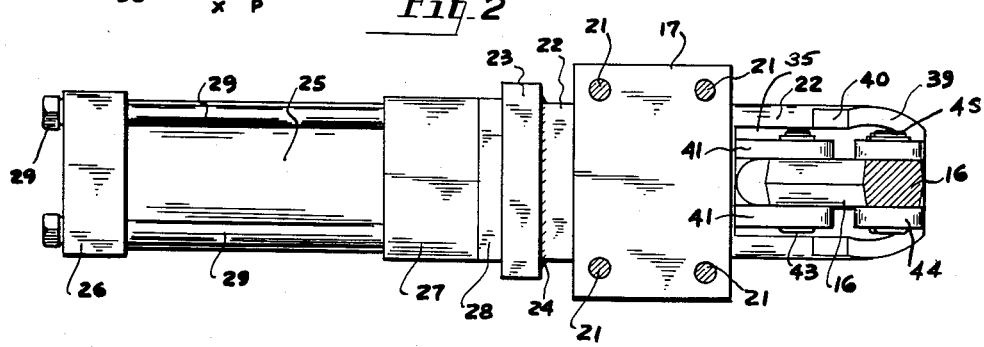
INVENTOR.
LELAND F. BLATT.
BY
ATTORNEY

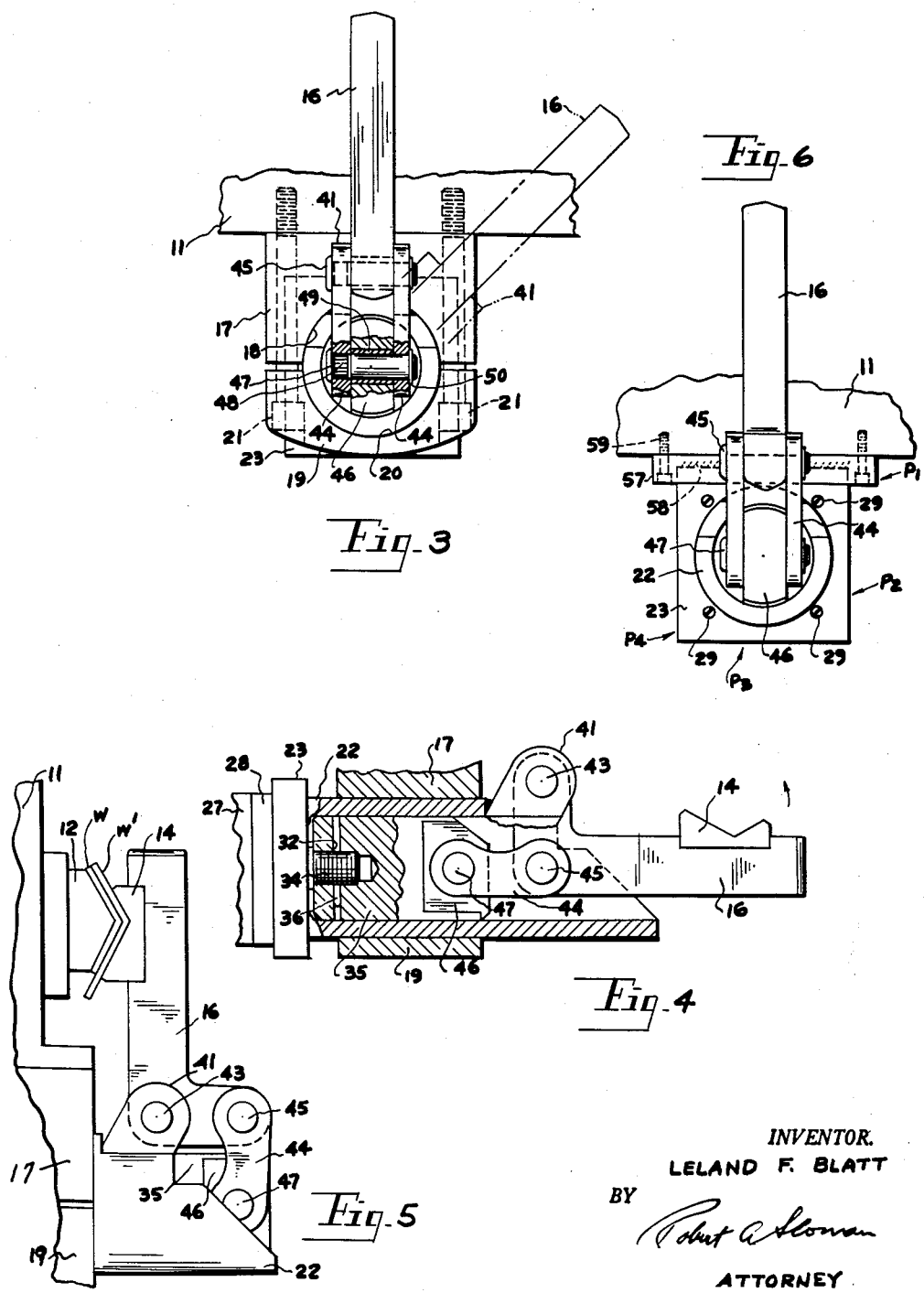

United States Patent Office 3,116,058
Patented Dec. 31, 1963

3,116,058
CYLINDER OPERATED POWER CLAMP
Leland F. Blatt, Grosse Pointe Woods, Mich.
(22930 Sherwood Ave., Warren, Mich.)
Filed Mar. 31, 1961, Ser. No. 99,943
1 Claim. (Cl. 269—31)

This invention relates to a cylinder operated power clamp, and more particularly to a hydraulically or pneumatically operated cylinder with reciprocal piston and linkage for effecting operative pivotal movements of a clamping arm.

It is the object of the present invention to provide an efficient and fast acting cylinder operated power clamp wherein a rectilinear reciprocal motion of the piston and connected part of the cylinder is transmitted to a pivotally mounted clamp mechanism.

It is another object of the present invention to provide a novel linkage arrangement between the rectilinearly movable piston rod assembly and the pivotally mounted clamp mechanism, whereby the application of pressure fluid through the respective alternate ports at opposite ends of the cylinder effects opening and closing movements of the clamp arm.

It is a further object of the present invention to provide a novel form of mounting plate for the body tube, which in turn supports the entire cylinder operated power clamp.

It is a further object of the present invention to provide novel mounting means for the body tube and associated parts by which the clamp arm may be radially positioned adjustably throughout 360 degrees, as desired.

These and other objects may be seen from the following specification and claim in conjunction with the appended drawings in which:

FIG. 1 is a side elevational view of the present cylinder operated power clamp, partially broken away and sectioned for illustration, and as mounted upon the support fragmentarily shown.

FIG. 2 is a section taken on line 2—2 of FIG. 1.

FIG. 3 is a right end elevational view thereof partially broken away and sectioned.

FIG. 4 is a fragmentary view similar to FIG. 1 showing the clamp arm in release position.

FIG. 5 is a fragmentary side elevational view similar to FIG. 1 showing the clamp arm in a reversed position from that shown in FIG. 1.

FIG. 6 is an end elevational view similar to FIG. 3, but showing another form of mount means for the power clamp.

It will be understood that the above drawings illustrate merely a preferred embodiment of the invention and that other embodiments are contemplated within the scope of the claim hereinafter set forth.

The present cylinder operated power clamp is mounted upon a suitable support 11, fragmentarily shown and which has mounted thereon an anvil 12, secured thereto at 13, and having an outer face conforming to the shape of the workpieces to be held by the said power clamp and which in the preferred embodiment are designated as W and W'.

The adapter 14 is secured at 15 to the clamp arm 16 forming a part of the power clamp for cooperative engagement with the assembly W and W' to which a mechanical operation of some nature is to be applied such as a welding operation or a boring or drilling or other machining operation.

In accordance with the present invention, the position of the parts shown in FIG. 1 and the said clamp arm 16 is effective for fixedly retaining the workpieces W and W' with respect to the anvil 12 on the support 11.

Two forms of mounting means are disclosed in the present application for the power clamp, one being of a type which will permit 360 degree radial positioning of the clamp arm 16. Such type is shown in assembled relation in FIGS. 1 and 3. This mount consists of a base 17, having a downwardly opening semi-cylindrical aperture 18 and the clamp plate 19 having an upwardly opening semi-cylindrical aperture 20. Plate 19 is adjustably positioned relatively to the base 17 and secured thereto by the series of upwardly extending bolts 21, which extend through the plate 19 and base 17 and thread up into the support 11, as best shown in FIG. 3.

The said mounting means 17—19 adjustably receives therethrough the longitudinally extending body tube 22 of cylindrical form which at one end is fixedly secured as by welds by 24 to the body plate 23, FIG. 1.

The power cylinder forming a part of the present invention is arranged upon the opposite side of the body plate 23 and secured thereto by means of the tie rods 29. The power cylinder 25 includes at its opposite ends the enlarged cylinder heads 26 and 27 and with a suitable spacer 28 interposed between the cylinder head 27 and plate 23, and the entire assembly fixedly secured upon the plate 23 by means of the series of tie rods 29.

It is noted that said tie rods extend through the respective cylinder heads 26 and 27 and are threaded into the body plate 23 as at 30, FIG. 1.

There is a conventional piston 31, movable within the bore of the cylinder 25 between the respective ports 1 and 2, shown in FIG. 1. Piston rod 32 is fixedly secured at one end to said piston 31 and cooperatively and movably extends through the gland 33 within the plate 23, said rod extending axially through the body tube 22 and threaded as at 34 into a corresponding bore within the end of piston 35.

The connection between the rod 32 and piston 35 is further completed by the transverse locking pin 36. Accordingly reciprocal movements of the piston 31 within the cylinder will effect simultaneous reciprocal movements of piston 35 within the body tube 22 with such movements being limited to rectilinear movements.

The body tube 22 has a cylindrical bore 37 which cooperatively receives piston 35 and defines to the left side of the said piston 35 a cushion chamber 38 for cushioning movements to the left of piston 35 by slight compression of the air therein, trapped within said chamber, thus the result is a natural built-in air cushion.

When the piston 31 moves in the opposite direction, piston 35 moves to the forward or clamped position shown in FIG. 1. At the same time a partial vacuum is formed within the chamber 38, thus affording some cushioning on the forward movement of piston 35.

The forward end of the sleeve tube 22 is tapered downwardly and outwardly as at 39, and terminates at its upper edges in the ledges 40 which are cutaway as shown in FIGS. 1 and 2. A pair of upright spaced ears 41 are mounted over top surface portions of the stationary body tube 22 and fixedly secured thereto as by welds 42.

The clamping arm 16 which is in the form of a cantilever is positioned at its lower free end between the ears 41 and pivotally mounted thereon by the pine assembly 43. A pair of upright parallel spaced links 44 are arranged upon opposite sides of an intermediate portion of the arm 16, and at their respective upper ends pivotally connected therewith by the pin 45.

The piston 35 at its outer end is flattened as at 46 to cooperatively receive the lower ends of the links 44 which are pivotally connected thereto as at 47 completing the linkage between piston 35 and the clamp arm 16.

Each of the pivots 43, 45 and 47 are the same, and are shown in further detail in FIG. 3, which is illustrative of the pivot 47. Here it is seen that the pivot pin 47 includes a knurled portion 48 which frictionally and retainingly engages one of the links 44 so as to be restrainedly against rotative movement. The pin 47 extends through the bushing 49 nested transversely through the rod end portion 46, and is fixedly secured in assembled relation by the snap ring 50, FIG. 3.

The same type of construction is also provided for the pivot pins 45 and 43, there being suitable bushings similar to bushing 49 nested through the apertured portions of the clamp arm 16.

A four-way valve is schematically shown at 51 in FIG. 1 showing a source of fluid pressure at P and an exhaust pipe at X by which pressure fluid, such as compressed air or liquid may be supplied and exhausted to the four-way valve for transmission through the respective conduits 52 and 53 to the corresponding ports 1 and 2 at opposite ends of cylinder 25. Said conduits are flexible and of sufficient length as not to interfere with rotary adjustment of tube 22 and associated cylinder 25, as desired.

In the schematic illustration, the valve 51 includes the piston rod 54 which projects therefrom and is operatively engaged by the control arm 55, pivoted at 56, there being as a part of a conventional four-way valve construction a spring biasing means within the valve for normally retaining the piston in one extreme position relative to the valve housing.

Accordingly manual control of the lever or cantilever 55 can control the positioning of the rod 54 and accordingly the control position of the four-way valve 51. Accordingly and assuming the valve element within the valve is at its extreme left hand position, fluid under pressure from the port P is transmitted through the conduit 52 to port No. 1, causing the piston 31 to move to the dotted line right hand position shown. At the same time the port No. 2 of the cylinder is connected by a conduit 53 to the valve 51 and the exhaust port indicated at X for exhausting to the atmosphere or to a tank, in case of fluid.

This movement to the right of the piston 31 is transmitted through the rod 32 and the rod end piston 35 to the lower ends of the links 44, which due to the wedging action achieved causes a pivotal locking movement of the clamp arm 16 in a counterclockwise direction around the pivot 43 to the clamping position shown in FIG. 1.

To obtain a release of the workpieces W and W', the fluid pressure is reversed to the ports 1 and 2, as by tilting movement in a clockwise direction of the cantilever 55, causing the valve 51 to reverse so that pressure fluid is delivered to conduit 53 and with exhaust returning through conduit 52. This would cause a retraction of the piston 31 and connected rod 32 and rod end piston 35.

The piston 35 is limited to rectilinear movement in view of its positioning within the bore 37 of the body guide tube 22 and accordingly such longitudinal movement of the rod end 35 effects through the links 44 a downward thrust upon the clamp arm 16 causing the same to pivot to the position shown in FIG. 4.

When employing the mount assembly shown at 17—19, FIG. 3, by loosening the fasteners 21 partially the body tube 22 may be rotated as desired so that the clamp arm 16 may be rotated to any desired radial position throughout 360 degrees, as for example the dotted line position shown. Under certain conditions, the power clamp may be operated with the clamp arm 16 reversed from the position shown in FIG. 1 to the position shown in FIG. 5.

The operation is exactly the same, except that the arm is pivotally mounted intermediate its ends upon the ears 41 by the pivot pin 43, whereas the free end of the arm is connected by the pin 45 to the upper ends of the links 44. In all other respects, the operation is exactly the same.

Another form of mount for the body assembly 22—23 is shown in FIG. 6 where the entire construction is the same, except that instead of the mount type of adjustable clamp 19—17, there is provided a unitary rectangular plate 57, which is positioned forwardly of the body plate 23 and fixedly secured thereto as by the continuous welds 58. The mount plate 57 may also be further welded along its central undersurface to top portions of the body tube 22.

A series of fasteners 59 extend up through the mount plate 57 and into the undersurface portion of the support member 11 for fixedly securing the power cylinder operated power clamp in the position shown in FIG. 6. This location of the mounting plate 57 is regarded as a position No. 1, indicated at P-1, FIG. 6. It is contemplated that this mount plate 57 may be respectively located in three additional right angularly related positions fixedly secured as at point P-2, P-3 or P-4, as desired, depending upon the problem involved, and the particular clamping operation desired.

Primarily it is seen that the rectilinear reciprocal movements of piston 35 effect a pulling or pushing action or wedging action upon the lower ends of the links 44, whose upper ends are pivotally connected with the clamp arm 16 for effecting the clamping operation and for positioning and retaining the clamp arm 16 in the securing position shown in FIG. 1, or in the release position shown in FIG. 4.

Having described my invention reference should now be had to the following claim.

I claim:

For use with a horizontally arranged supporting base having an exposed vertical surface;
a unitary clamping means including a horizontally arranged tube having a closed end and an open end;
means adapted to adjustably clamp said tube horizontally in place to the base and permitting the tube to be rotatably adjusted around its longitudinal axis to occupy a desired radial position;
a rod in said tube;
pneumatic means unitary with said tube and having a piston rod connected to said tube rod for moving the tube rod along its axis and the axis of the tube;
the open end of the tube adapted to project beyond the supporting base;
the side of the tube at said open end having a lateral projection;
a clamp;
a pivot pin in said lateral projection pivotally connecting the clamp to said lateral projection of said tube;
a piston secured to said tube rod adjacent the open end of the tube;
and a link pivotally connecting the clamp to the outer end of the piston;
whereby a workpiece may be clamped against said vertical surface of said base, in any desired radially adjusted position of said tube, and said piston on said tube rod forms in said tube rod forms in said tube on air cushion.

References Cited in the file of this patent
UNITED STATES PATENTS

| | | |
|---|---|---|
| 884,548 | Warwick | Apr. 14, 1908 |
| 1,375,928 | Olson | Apr. 26, 1921 |
| 1,822,501 | Onsrud | Sept. 8, 1931 |
| 1,997,428 | Olson | Apr. 9, 1935 |
| 2,798,234 | Benninghoff et al. | July 9, 1957 |
| 2,972,476 | Blatt | Feb. 21, 1961 |

FOREIGN PATENTS

| | | |
|---|---|---|
| 709,285 | Great Britain | May 19, 1954 |